UNITED STATES PATENT OFFICE.

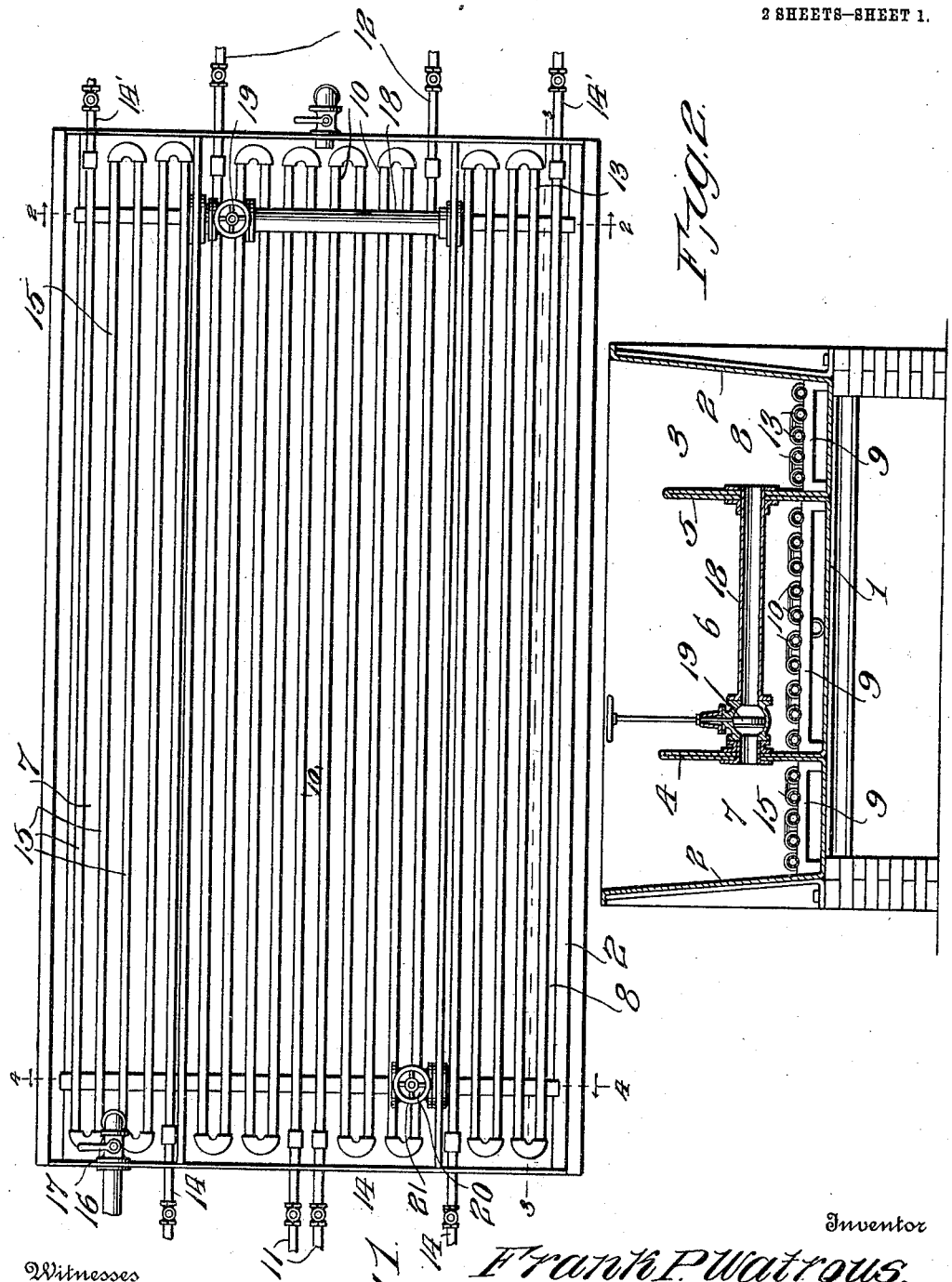

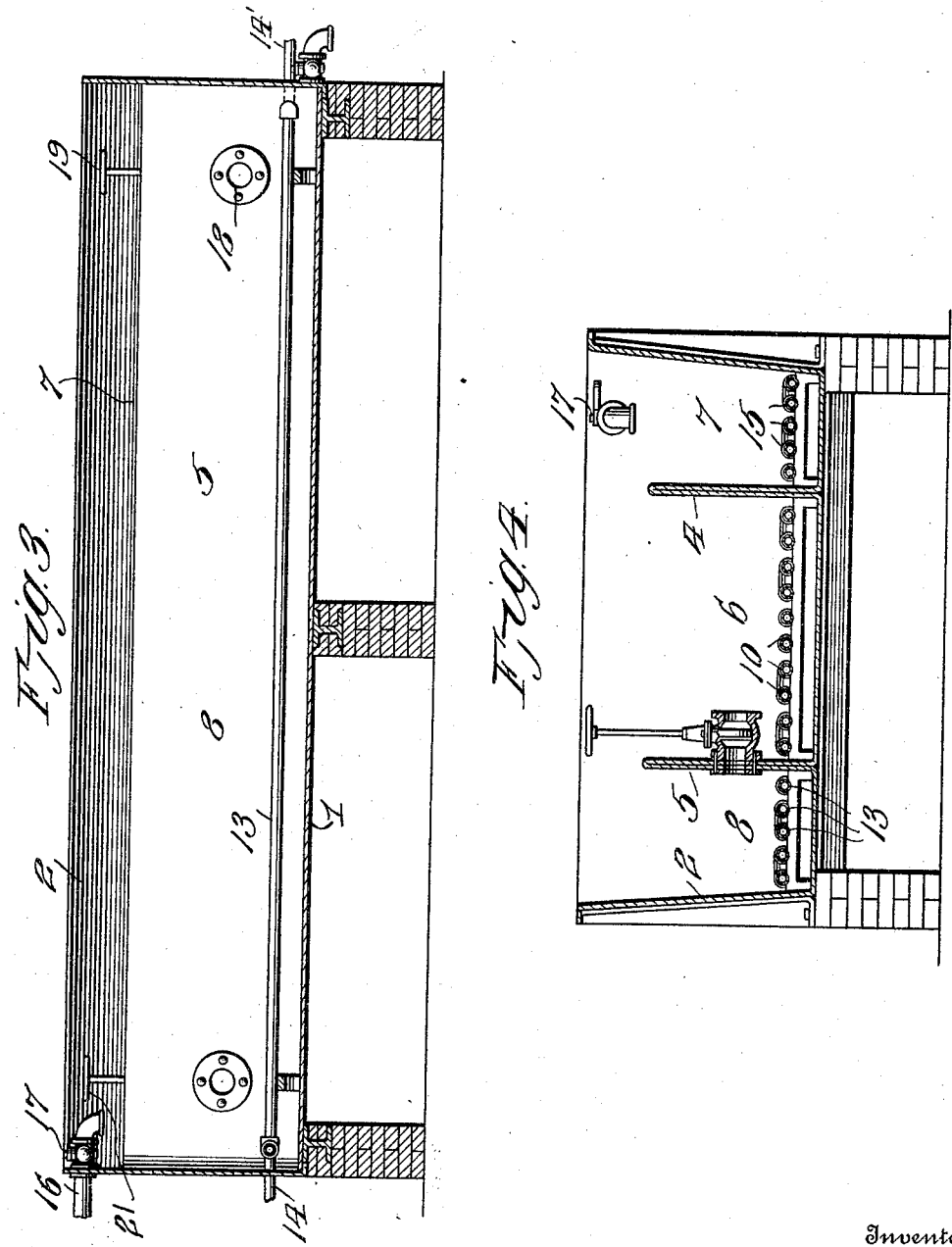

FRANK P. WATROUS, OF LONG BEACH, MISSISSIPPI.

DEFECATING AND EVAPORATING APPARATUS.

1,006,321. Specification of Letters Patent. Patented Oct. 17, 1911.

Application filed January 10, 1911. Serial No. 601,822.

*To all whom it may concern:*

Be it known that I, FRANK P. WATROUS, a citizen of the United States, residing at Long Beach, in the county of Harrison and State of Mississippi, have invented new and useful Improvements in Defecating and Evaporating Apparatus, of which the following is a specification.

The invention relates to an improved defecating and evaporating apparatus for saccharin fluids, being more particularly directed to a purifier and evaporator in which the fluid is treated in an expeditious manner to eliminate the maximum proportion of impurities therefrom.

The main object of the present invention is the provision of a defecating apparatus in which the fluid is initially subjected to a gravity settling effect aided to a greater or less degree by heat, and finally subjected to a boiling action to project the impurities to the surface of the fluid, the settling and boiling apparatus being maintained in separated compartments in which the boiling compartment forms the center, whereby the impurities eliminated in the boiling compartment will be delivered to the settling tanks for mechanical removal.

The invention will be described in the following specification, reference being had particularly to the acompanying drawings, in which:—

Figure 1 is a plan of the improved defecating apparatus. Fig. 2 is a section on line 2—2 of Fig. 1. Fig. 3 is a section on line 3—3 of Fig. 1. Fig. 4 is a section on line 4—4 of Fig. 1.

Referring particularly to the accompanying drawings, the improved defecating and evaporating apparatus is shown as used in connection with a steam heating apparatus, though it is to be understood, as will later appear, that it can be used with equal efficiency with an open furnace fire.

In the preferred form of details illustrated in the drawings, the improved defecating and evaporating apparatus comprises a tank 1, preferably though not necessarily constructed of sheet material, having side walls 2 and end walls 3 to form the usual open tank construction. The material of the tank is preferably formed to provide two spaced longitudinal partitions 4 and 5, which partitions extend throughout the full length of the tank and in parallel relation to each other and to the side walls. The partitions 4 and 5 are of less height than the side walls and are arranged to provide a greater transverse distance between them than between either of them and the proximate side wall, thereby providing what will be hereinafter termed a central boiling compartment 6 and side settling compartments 7 and 8, said latter compartments being of duplicate dimensions and of materially less width than the boiling compartment disposed between them. A series of steam pipes are supported in each compartment, being preferably arranged upon bridges 9 so as to support the coils which are disposed in horizontal planes above the bottom of the compartments. Steam pipes 10 within the boiling compartment are arranged in two coils having their initial lengths disposed longitudinally and centrally of the compartment fed from supply pipes 11, leading from any suitable source of steam supply. The outlet terminals of the respective coils 10, as 12, provide live steam outlets from which the steam may be directed to any purpose, both the inlets and outlets being preferably valved. The compartments 7 and 8 are also each provided with a coil as 13 and 15, having inlets 14 and outlets 14'. The inlets 14 are in communication with the exhaust steam supply from the engine, so that in its passage through the tank coils said steam is condensed and delivered from the outlets as hot water which may be reused, as in the boiler of the original engine.

The settling compartment 7 is provided with a fluid inlet 16 controlled by a gate or valve 17, and at the opposite end the said compartment 7 is connected with the compartment 8 by a transferring pipe 18 the passage through which is also controlled by a gate or valve 19. The settling compartment 8 at the end opposite the connection with the transferring pipe is in communication with the boiling compartment through an outlet 20 controlled by a gate 21. The communication of the pipe 18 with the respective compartments 7 and 8 and the pipe 20 with the compartment 8 is some distance above the bottoms of the respective compartments whereby to draw the liquid from one compartment to another from a point above the bottom in order to avoid transferring the settlings.

In use, the fluid is initially admitted to the compartment 7 and caused to flow longitudinally thereof eliminating some of the impurities by settling. At the end of the compartment 7 remote from the inlet of the fluid, the latter finds a path to the remaining settling compartment through the pipe 18. In the compartment 8 the liquid is again directed longitudinally and delivered to the boiling compartment. By the arrangement of the steam pipes the liquid will, of course, be given the maximum degree of heat in the boiling compartment, this degree of heat being sufficient to cause the boiling of the liquid. Furthermore within the boiling compartment the maximum heat line will be centrally of said compartment. The liquid is thus heated to the boiling point and, as is well known, directing more or less of the impurities to the surface of the liquid in the form of scum. This in the boiling of the liquid will be directed toward the partitions and over the tops of the same into the settling compartments, being removed therefrom by the usual operation of skimming.

It is to be understood that the liquid in the settling compartments is never brought to the boiling point, which result will be gained by regulating the amount of steam in coils and amount of cold juice flowing into the evaporator. The liquid is permitted to flow the full length of both settling compartments before delivery to the boiling compartment, during which travel a very material portion of those impurities which can be separated by settling will be removed. Furthermore, the steam in its final delivery from the apparatus will be in condensed form permitting the hot water to be redirected to the boiler, thus tending to an economical operation.

While preferring that the improved purifier and evaporator be operated by steam it is obvious that an equally efficient result can be gained in the open furnace heater in which the pan is supported above the fire box in such way that the maximum heat is directed to the boiling compartment, the settling compartments being preferably arranged beyond the side walls of the furnace or otherwise protected against direct application of the heat. The usual disadvantageous result of boiling over incident to this class of purifiers and evaporators is obviated by this construction as the liquid in the settling compartments is never brought to the boiling point, thereby providing a comparatively cool body on each side of the boiling body and absolutely preventing the contents from boiling over the side of the tank.

Having thus described the invention, what is claimed as new is:—

1. A defecating and evaporating apparatus including a pair of settling tanks and a boiling tank arranged between the settling tanks, said settling tanks being in communication with each other at one end, and one of the settling tanks being in communication with the boiling tank at the end opposite its communication with the other settling tank.

2. A defecating and evaporating apparatus including a tank divided longitudinally by spaced partitions to provide side settling compartments and an intermediate boiling compartment, a pipe section establishing communication between the settling tanks at one end, and a pipe section establishing communication between one of the settling tanks and the boiling tank, and heating means having its maximum effect in the boiling tank and its minimum effect in the settling tanks.

3. A defecating apparatus including a tank formed to provide longitudinally disposed spaced partitions dividing said tank into a central boiling compartment and a plurality of settling compartments, two steam coils arranged in the boiling compartment and having their initial lengths disposed centrally and longitudinally of said compartment and connected to the steam supply and a coil for exhaust steam arranged in each of the settling compartments.

4. A defecating and evaporating apparatus comprising a tank divided to provide a central boiling compartment and side settling compartments, the divisions between the respective compartments being of less height than the walls of the tank, one of said settling compartments being closed against the boiling compartment but in communication with the other settling compartment, said latter settling compartment being in communication with the boiling compartment at the end remote from its communication with the first named settling compartment.

5. A defecating and evaporating apparatus comprising a tank divided to provide a central boiling compartment and side settling compartments, the division between the respective compartments being of less height than the wall of the tank, one of said settling compartments being closed against the boiling compartment but in communication with the other settling compartment, said latter settling compartment being in communication with the boiling compartment at the end remote from its communication with the first named settling compartment, means for imparting the maximum degree of heat longitudinally and centrally of the boiling compartment, and means for imparting a less degree of heat to the respective settling compartments.

In testimony whereof I affix my signature in presence of two witnesses.

FRANK P. WATROUS.

Witnesses:
BESSIE M. MAXWELL,
MATILDA GATES.

Copies of this patent may be obtained for five cents each, by addressing the "Commissioner of Patents, Washington, D. C."